(12) United States Patent
Liao

(10) Patent No.: US 6,595,072 B2
(45) Date of Patent: Jul. 22, 2003

(54) SENSOR OF THE PEDALING FORCE OF A POWER-ASSISTING BIKE

(76) Inventor: Gordon Liao, No. 5, Alley 54, Lane 737, Chung Jeng North Road, Yung Kang City, Tainan Hsien (TW)

(*) Notice: Subject to any disclaimer, the term of this patent is extended or adjusted under 35 U.S.C. 154(b) by 0 days.

(21) Appl. No.: 10/015,175

(22) Filed: Oct. 22, 2001

(65) Prior Publication Data

US 2003/0074985 A1 Apr. 24, 2003

(51) Int. Cl.[7] .............................. G01L 3/02; B62K 11/00
(52) U.S. Cl. .................................. 73/862.195; 180/206
(58) Field of Search ...................... 73/862.195, 862.193, 73/862.335, 862.53; 180/206

(56) References Cited

U.S. PATENT DOCUMENTS

| | | | | |
|---|---|---|---|---|
| 4,541,500 A | * | 9/1985 | Gelhard ........................ 180/205 |
| 5,857,537 A | * | 1/1999 | Matsumoto et al. ........ 180/205 |
| 5,941,333 A | * | 8/1999 | Sun et al. ..................... 180/206 |
| 6,015,159 A | * | 1/2000 | Matsuo ......................... 280/236 |
| 6,144,125 A | * | 11/2000 | Birkestrand et al. ......... 180/206 |
| 6,304,048 B1 | * | 10/2001 | Davies et al. ................ 318/266 |

* cited by examiner

*Primary Examiner*—Hezron Williams
*Assistant Examiner*—Lilybett Martir
(74) *Attorney, Agent, or Firm*—Alan D. Kamrath; Rider, Bennett, LLP

(57) ABSTRACT

A sensor of the pedaling force of a power-assisting bike includes a transmission system provided with at least one pair of screw gears. One of the screw gears is activated by the pedaling force to rotate at an original location and the other driven by a screw gear engaging with to rotate and shift along a shaft, with a resilience member fitted at an end side. An annular magnet is fitted around the end of the shaft of the resilience member and the screw gear, capable to shift together with said screw gear. A Hall sensor is provided on a fixed side of the annular magnet. Thus, the lateral force produced by the screw gears can detect an axially shifting distance of the screw gear and give out a voltage signal to control a motor to output motive power for the bike.

1 Claim, 4 Drawing Sheets

SENSOR OF THE PEDALING FORCE OF A POWER-ASSISTING BIKE

BACKGROUND OF THE INVENTION

This invention relates to a sensor of the pedaling force of a power-assisting bike, particularly to one simple in structure and possible to lower producing cost as will as elevate economic gain.

A conventional pedaling-force sensor of a power-assisting bike (usually an electric bike) is provided to give out signals for a power-assisting transmission system to output motive power for a bike so as to let a rider pedal the bike with less force.

SUMMARY OF THE INVENTION

The objective of this invention is to offer a pedaling-force sensor of a power-assisting bike, simple in structure and possible to reduce producing cost and enhance economic gain.

The feature of the invention is that at least one pair of screw gears is installed in a speed-increasing system provided between the pedal cranks and the chain wheel of a bike. In this speed-increasing system, a first screw gear is actuated by the pedaling force to rotate at its original location while a second screw gear meshes with and is activated by a relative screw gear unit to move along a transmission shaft. Besides, an annular magnet device is provided at an end side of the second screw gear, capable to rotate together with the second screw gear. Then a resilience member is provided to permanently push against the annular magnet device and render it capable to return to its original position in case no motive power is supplied. Besides, the resilience member will be forced to deform by a lateral force produced when the screw gears are rotating so as to make the force balanced. Further, a Hall sensor is provided at a fixed end relative to the annular magnet device, capable to detect the variation of the position-shifting amount of the annular magnet device and measure a voltage signal representing the pedaling force. This voltage signal can control a motor installed on a bike to output motive power to drive the chain wheel of the bike.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a sensor (1) of the pedaling force of a power-assisting bike includes a first transmission shaft (A), a one-way ratchet (B), a first left-handed screw gear (C), a second transmission shaft (L), a second right-handed screw gear (D), a third left-handed screw gear (E), a fourth right-handed screw gear (F), a motor (O) and a Hall sensor (N) as main components combined together.

The first transmission shaft (A) has both ends (A1), (A2) respectively connected with the opposite pedal cranks (H1), (H2) of a bike so that the first transmission shaft (A) can be activated to rotate when the pedal cranks (H1), (H2) are pedaled (by manpower for instance).

The one-way ratchet (B) is axially fitted near a left end of the first transmission shaft (A), having counterclockwise teeth and capable to transmit (if viewed from the end (A1) towards the end (A2) of the transmission shaft (A). One teeth side of the one-way ratchet (B) is firmly fitted with the first left-handed screw gear (C) so that, when the first transmission shaft (A) is rotated counterclockwise, the first left-handed screw gear (C) will also rotate in the same direction.

Figure 3:
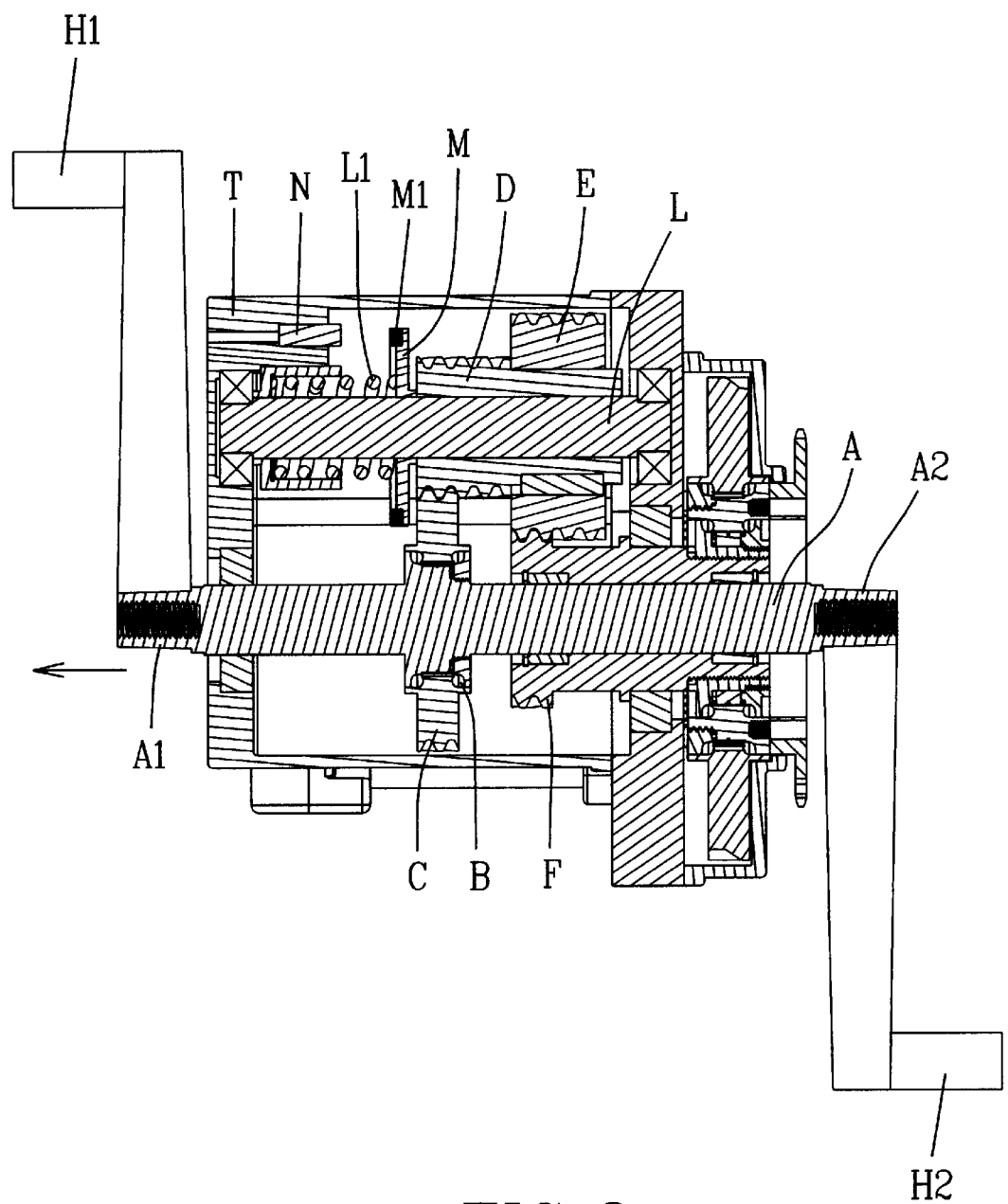
FIG. 3 is a side cross-sectional view of the transmission system of a power-assisting bike in the present invention.

Furthermore, a second transmission shaft (L) is positioned adjacent to the first transmission shaft (A), having a second right-handed screw gear (D) provided axially, movable in position and engaging with the first left-handed screw gear (C) of the first transmission shaft (A), as shown in FIG. 3. Thus, when the first left-handed screw gear (C) is activated to rotate counterclockwise, the second right-handed screw gear (D) will rotate clockwise.

Figure 1:
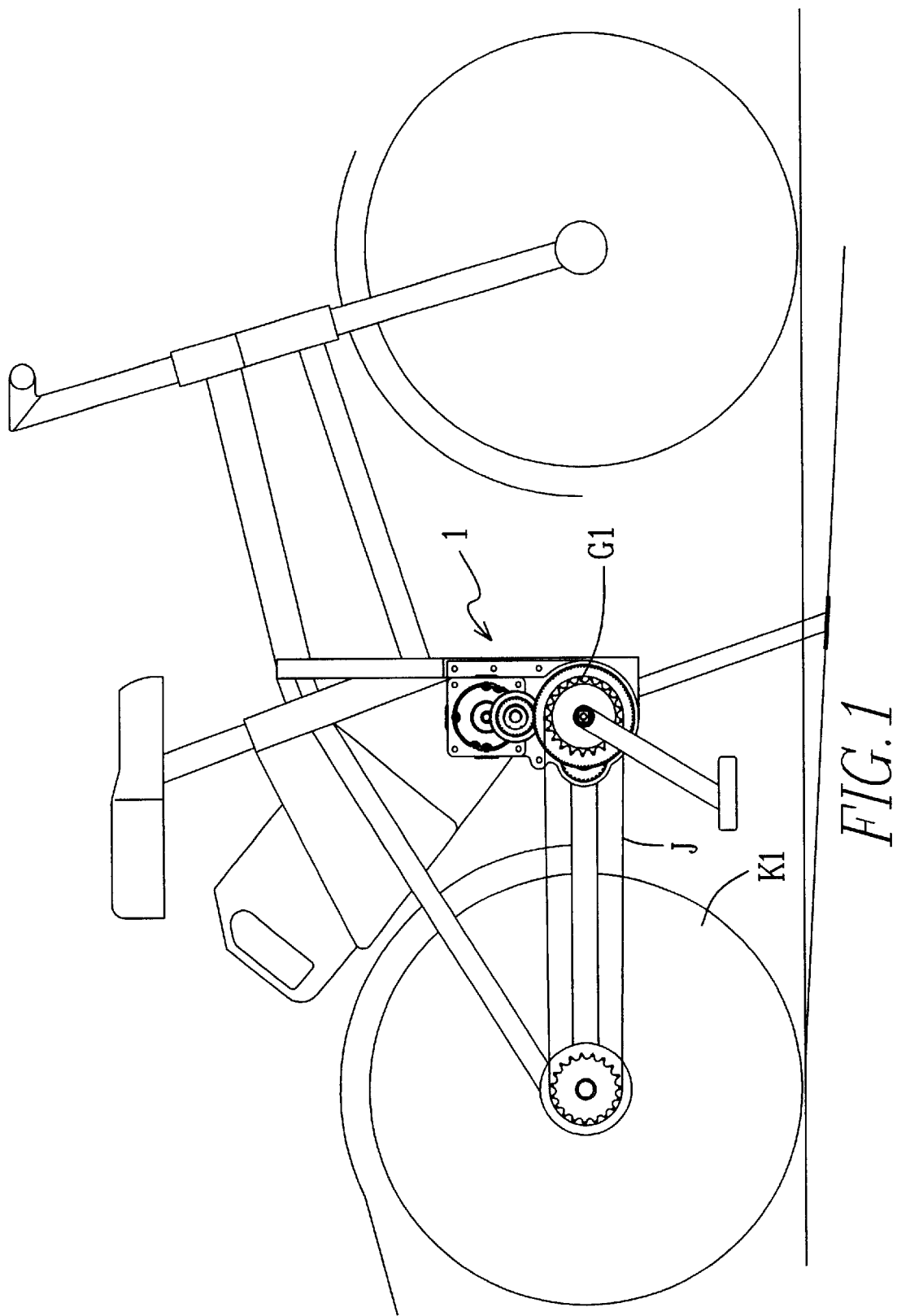
FIG. 1 is a cross-sectional view of a pedaling-force sensor installed on a bike in the present invention.
Figure 2:
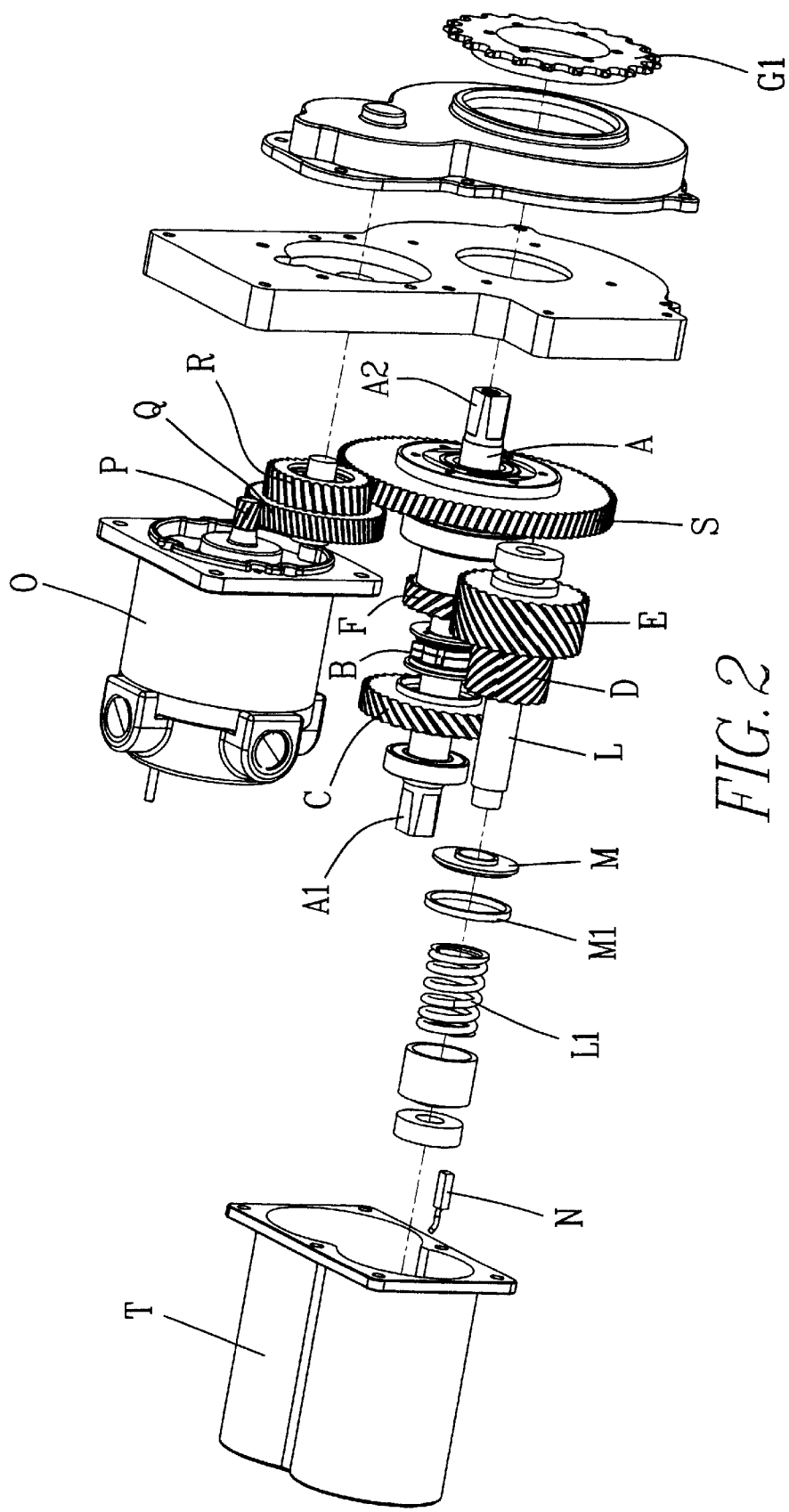
FIG. 2 is an exploded perspective view of the sensor of the pedaling force of a bike in the present invention.
Figure 4:
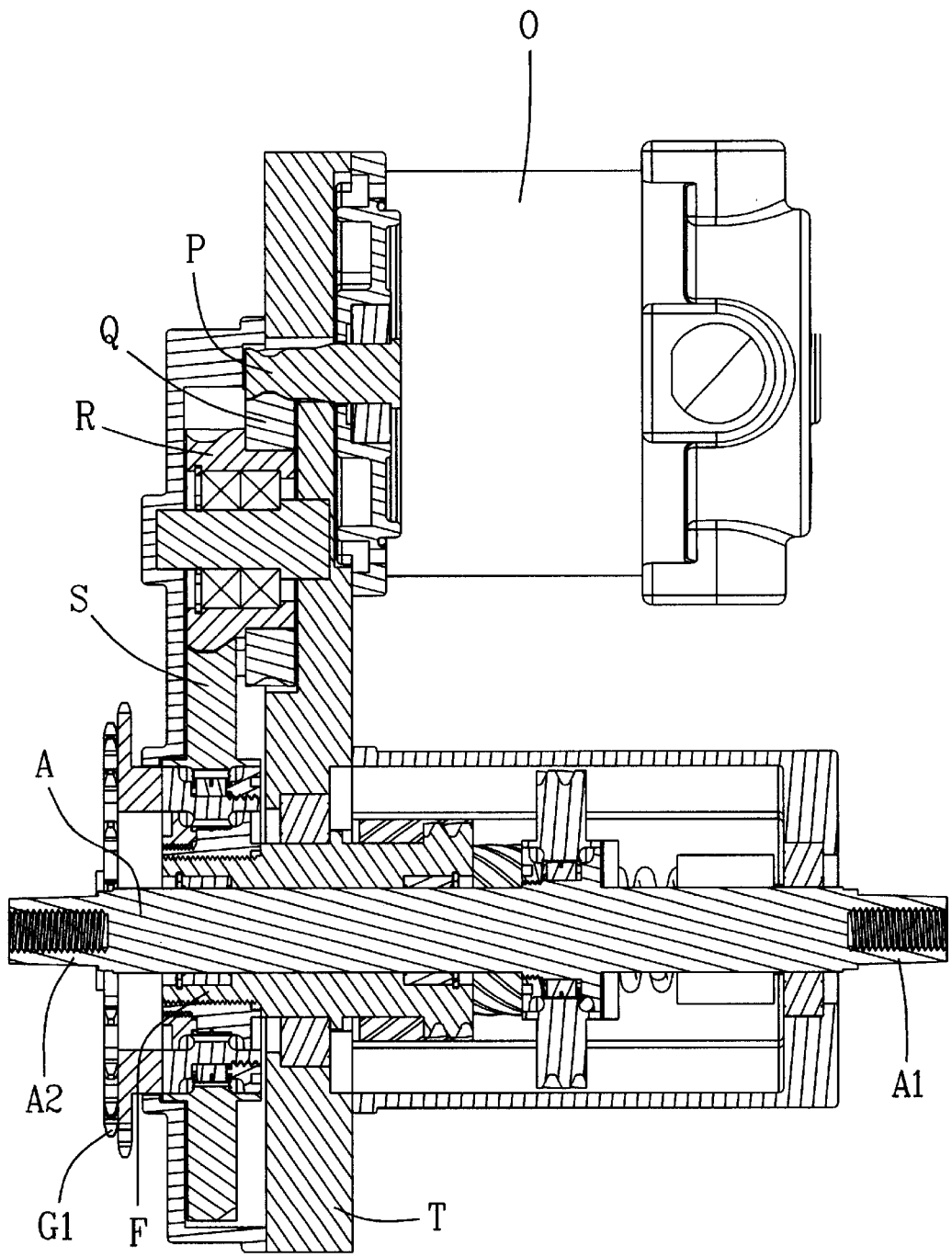
FIG. 4 is side cross-sectional view of the pedaling-force sensor in the present invention.

In addition, the third left-handed screw gear (E) is firmly fitted with one side of the second right-handed screw gear (D) so as to rotate together in a same direction. Then, the fourth right-handed screw gear (F) is axially fitted on the first transmission shaft (A) meshing with the third left-handed screw gear (E) and rotating together with the first left-handed screw gear (C) in a same direction. The end side of the fourth right-handed screw gear (F) facing the end (A2) of the first transmission shaft (A) is connected with a chain wheel (G1), as shown in FIG. 4 to activate a chain (J) to move and make the rear wheel (K1) of a bike to rotate counterclockwise and move forward, as shown in FIG. 1.

When the pedal cranks (H1), (H2) are pedaled, and the first transmission shaft (A) is driven to rotate counterclockwise (viewed from the end (A1) towards the end (A2) of the first transmission shaft (A), the first left-handed screw gear (C) also rotates counterclockwise because of the counterclockwise rotatable one-way ratchet (B) coaxially fitted between the first transmission shaft (A) and the first left-handed screw gear (C). And meanwhile, the second right-handed screw gear (D) and the third left-handed screw gear (E), being connected together and fitted around the same transmission shaft (L), are actuated to rotate clockwise and synchronously, the fourth right-handed screw gear (F) of the first transmission shaft (A) and the chain wheel (G1) connected to each other are activated to rotate counterclockwise and drive the chain (J) as well as the rear wheel (K1) of the bike to rotate and move forward in the same direction.

In the process of transmitting, a physical characteristic of lateral force will naturally occur when the screw gear (C), (D), (E), (F) are rotating. Therefore, a lateral force towards the end (A1) of the first transmission shaft (A) will be produced when the first left-handed screw gear (C) activates the second right-handed screw gear (D to rotate, and another lateral force towards the end (A1) of the first transmission shaft (A) will also be produced when the third left-handed screw gear (E) activates the fourth right-handed screw gear (F) to rotate.

Additionally, as there is no locking device provided between the second as well as the third screw gears (D) and (E) and the second transmission shaft (L), therefore these two screw gears (D) and (E) are able to move straight along the second transmission shaft (L) and the torque of the pedaling force of the pedal cranks (H1) and (H2) can be detected according to the shifting distance of the second and the third screw gears (D) and (E).

Further, the thickness of the second and the third screw gears (D) and (E) i s greater than that of the first and the fourth screw gears (C) and (F) in order to ensure a permanent engagement between them, that is, when the second and the third screw gears (D) and (E) are actuated to rotate and shift axially, they can still mesh with the first and the fourth screw gears (C) and (F).

Next, a resilience member (L1) is fitted around a sliding end side of the second and the third screw gear (D) and (E) to be compressed to deform by the lateral force produced when the second and the third screw gears (D) and (E) are rotating. Thus, when the transmission system carries on transmitting, the shifting amount of the second and the third screw gears (D) and (E) can be proportionate to torque output of the first transmission shaft (A), and besides, the second and the third screw gears (D) and (E) can be forced to return to its original position by the resilience member (L1).

Then, for detecting the shifting distance of the second and the third screw gears (D) and (E), an annular magnet device is provided on the sliding end (left end) of the second screw gear (D). The annular magnet device has a ring (M) assembled with an annular magnet (M1) and a Hall sensor (N) is installed at a position relative to the shifting side of the annular magnet (M1), possible to be secured on the inner wall of a gear-box casing (T), as shown in FIG. 3.

By so designing, a voltage signal representing the pedaling force of the pedal cranks (H1) and (H2) can precisely be detected in accordance with a variation of the distance between the Hall sensor (N) and the annular magnet (M1). This voltage signal can control the motor (O) to output motive force and the gear (P) positioned at the front end of the shaft of the motor (O) activates a speed-reducing system composed of gears (Q), (R), (S) to rotate together with the chain wheel (G1), thus reaching a goal of outputting assistant motive-power for the bike, as shown in FIG. 4.

As described above, the second and the third screw gear (D) and (E) are respectively the right-handed screw gear only to increase a deflection force in shifting. Therefore, so long as either the first screw gear unit including the first screw gear (C) and the second screw gear (D) or the second screw gear unit including the third screw gear (E) and the fourth screw gear (F) is of screw gears and the other unit can be of straight bevel gears or still of screw gears, a lateral force can equally be produced and applied for detecting the pedaling force of a power-assisting bike when the screw gears are used.

As can be understood from the above description, in the transmission system of the invention, the screw gears (C), (D), (E), and (F) are driven to rotate and produce a lateral force for detecting the variation of the pedaling force with the help of the sensor (N) and then outputting motive power for the bike, evidently simple in structure, convenient in assembling and possible to reduce producing cost.

While the preferred embodiment of the invention has been described above, it will be recognized and understood that various modifications may be made therein and the appended claims are intended to cover all such modifications that may fall within the spirit and scope of the invention.

What is claimed is:

1. A sensor of the pedaling force of a power-assisting bike comprising:

a transmission system, and an annular magnet device, wherein:

said transmission system includes:

a first transmission shaft that is rotated by a pedaling force;

a first screw gear secured on said first transmission shaft, so that said first screw gear is rotated by said first transmission shaft without axial movement;

a second transmission shaft located in parallel with said first transmission shaft;

a second screw gear that is axially movable along said second transmission shaft being mounted on said second transmission shaft and engaging with said first screw gear;

wherein, when said second screw gear is rotated by said first screw gear, an axial force is produced in the rotation and forces said second screw gear to generate displacement along said second transmission shaft; and a resilience member mounted on said second transmission shaft and urged on a side of said second screw gear; and said annular magnet device includes:

an annular magnet mounted on said second transmission shaft, being axially movable along said second transmission shaft, and being secured on the side of said second screw gear, so that said annular magnet is axially displaced with said second screw gear; and a Hall sensor located at a fixed position adjacent to said annular magnet, so that said annular magnet is displaced on said second transmission shaft relative to said Hall sensor, wherein:

a distance between said annular magnet and said Hall sensor is varied according to the axial force applied on said annular magnet by said second screw gear, so that said Hall sensor detects variation of displacement of said annular magnet relative to said Hall sensor and outputs a varied voltage;

said varied voltage indicates a varied torque of the pedaling force driving said first transmission shaft and controls a motor to output an assisting power.

* * * * *